March 30, 1954 L. GOODMAN ET AL 2,673,465
TEMPERATURE RESPONSIVE INSTRUMENT
Filed March 24, 1951
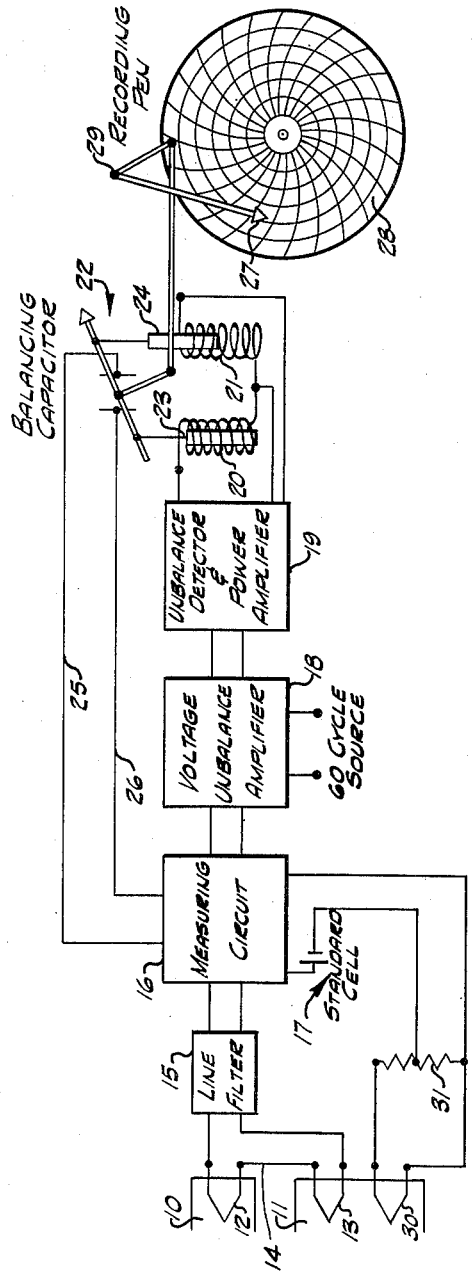
INVENTORS
LOUIS GOODMAN
EVERETT O. OLSEN
BY
Curtis, Morris + Safford
ATTORNEYS Patented Mar. 30, 1954

2,673,465

UNITED STATES PATENT OFFICE 2,673,465

TEMPERATURE RESPONSIVE INSTRUMENT

Louis Goodman, Millis, and Everett O. Olsen, Wrentham, Mass., assignors to The Foxboro Company, Foxboro, Mass., a corporation of Massachusetts Application March 24, 1951, Serial No. 217,392

3 Claims. (Cl. 73—360)

This invention relates to instruments of the type used for recording, indicating, and/or controlling values of variable conditions such as temperature, pressure, flow, and the like.

It is particularly concerned with such instruments wherein such conditions are represented in the instruments in terms of electrical units; for example, volts.

A practice has been to set up a standard voltage within the instrument for automatic comparison with a voltage representative of a variable condition. The result of this comparison represents the departure, if any, of the variable condition from a reference point represented by the standard voltage.

It is an object of this invention to provide a variable corrective voltage for totalling with such a standard voltage, as compensation needed as the variable condition changes. This compensation is needed because the relation of the variable condition change to the representative voltage change is not linear. It is desirable to provide linearity in such voltage change in order to keep the output of the instrument within practical span limits of indication, recording, or control, where the range of the variable condition is substantial. The illustration of the invention given herein uses temperature as a variable condition but the invention is not limited to temperature responsive instruments.

The standard voltage may be set up by a standard cell, a battery or other comparable source of fixed potential.

The variable condition may be something other than temperature. For example, it may be flow, pressure, liquid level, or other variables, or a combination of variables. In furtherance of this example, a voltage representative of a pressure may be compared to a standard cell voltage corrected in accordance with variations in a different variable condition, such as temperature.

Other objects and advantages of this invention will be in part obvious and in part pointed out hereinafter. These objects and advantages are attained by the novel methods and apparatus described in the following specification, and they may be more readily understood by reference to the accompanying drawing in which a schematic diagram of a recording instrument is shown in an illustrative embodiment of this invention.

The device as represented in the drawing is only a vehicle for illustration of this invention and is an instrument for recording the values of a variable temperature differential condition. At the left of the drawing there are two temperature chambers 10 and 11. The instrument records the difference in temperatures of these chambers, that is, the temperature differential.

In each temperature chamber there is a thermocouple as a temperature sensing element, as at 12 and 13. These thermocouples respond to temperature by producing small voltages representative of the temperature.

The temperature differential of the thermocouples 12 and 13 produces a representative voltage differential by bucking the voltages produced by the thermocouples against each other. This bucking is accomplished by connecting thermocouple legs of like polarity, by a connecting line 14. The differential voltage thus produced, is representative of the temperature difference between the chambers 10 and 11.

This differential voltage is applied, through a line filter 15, to a measuring circuit 16, for comparison with the voltage of a standard cell 17 which is associated with the measuring circuit 16. A measuring circuit of this type, and such a comparison of voltages, is disclosed in the copending application of one of the present inventors, Louis Goodman, Serial No. 783,261, filed October 31, 1947, now Patent No. 2,628,994, and in another copending application by Wilfred H. Howe, Serial No. 714,611, filed December 6, 1946, now Patent No. 2,596,955.

Referring again to the drawing of the present application, the measuring circuit 16 and its associated arrangements constitute a form of the well-known null balance circuit, in which the result of the standard cell comparison, that is, the unbalance of the measuring circuit 16, is amplified in the voltage unbalance amplifier 18. The direction of the unbalance is determined in the unbalance detector portion of the unit 19, and the unbalance is then amplified in the power amplifier portion of the unit 19 and thereafter applied to one of the solenoid coils 20 and 21, depending upon the direction of unbalance.

Above the solenoid coils 20 and 21 there is shown a balancing capacitor 22 which is mechanically connected to the solenoid plungers 23 and 24 and yet is electrically a part of the measuring circuit 16, through leads 25 and 26. Thus, unbalance applied to one of the coils 20 and 21 results in automatic mechanical adjustment of the variable capacitor 22 until the measuring circuit 16 is balanced. The adjustment of the capacitor 22 is therefore a function of the temperature differential between the chambers 10 and 11.

A record of this temperature differential is made by mechanically connecting a pen 27 and chart 28 as a recording arrangement, to the moving portion of the balancing capacitor 22, through a suitable linkage 29. A power source, 60 cycle for example, supplies the entire circuit through the voltage unbalance amplifier 18.

This instrument, as thus far described, customarily measures equal millivolt increments rather than equal temperature increments. The temperature-millivolt curve is not linear. The voltage produced by a given differential temperature span at one section of the temperature range is different than the voltage produced by the same differential temperature span at another section of the temperature range. Thus there is produced 2.96 millivolts by an iron constantan thermocouple when its temperature is increased from 100° F. to 200° F. The same thermocouple produces 3.52 millivolts when its temperature is increased from 1500° F. to 1600° F.

The circuit and arrangement with which this invention is particularly concerned, as will be shown, is in addition to the circuit and arrangement already described herein, and it provides correction for the temperature-millivolt curve so that a differential temperature span at one temperature range section will produce, in close approximation, the same millivoltage as the same differential span at another temperature range section.

This result is produced by applying an automatically variable corrective voltage to the circuit in series with standard cell 17 so that the value of the corrective voltage is totalled with that of the cell 17. This voltage is produced by placing a third thermocouple 30 in one of the temperature chambers. In this instance the thermocouple 30 is located in chamber 11 in the same temperature ambiency as that of the thermocouple 13. The thermocouple 30 is thus exposed to a temperature which is close enough to the temperatures being measured to satisfy practical purposes in providing a corrective voltage to be totalled with the voltage of the standard cell 17. A voltage divider is associated with the corrective thermocouple 30, as at 31, so that the corrective voltage applied to the standard cell 17 is in reduced proportion to the voltage produced by the second thermocouple 13.

As the temperature range section of chambers 10 and 11 is changed; for example, from about 100° F. to about 1500° F., the voltage of the thermocouple 30, as reduced by the voltage divider 31, is automatically totalled with the voltage of the standard cell 17, thus providing an automatic correction of the voltage of the standard cell. However, the number of millivolts generated as a differential from the thermocouples 12 and 13, for the same temperature differential, is also changed. This means that the recording range of the instrument is changed, that is, the number of millivolts necessary to cause the pen to go from 0% to 100% of scale of the chart is changed. The net result is that the instrument records, in close approximation, the same temperature difference at the 1500° F. range as at the 100° F. range.

The corrective voltage from the thermocouple 30 may be added or subtracted to or from the standard cell 17, according to the circumstances of the temperature change. Therefore the voltage from the thermocouple 30 may be said to be totalled with the voltage of the standard cell 17.

In the particular instance of the structure shown in the drawing, the variable condition may be considered to be the voltage differential representing the temperature differential, and the voltage from the thermocouple 30 may be considered to be a variable condition operatively associated with the voltage differential variable condition. In variation of this invention, the voltage from either of the thermocouples 12 and 13 may be considered a variable condition operatively associated with the voltage differential variable condition, within the herein intended scope of the meaning of the phrase "operatively associated."

If desired, a single thermocouple instrument may be similarly corrected in its standard cell voltage by a corrective thermocouple voltage applied to the standard cell through a voltage divider.

As many other possible embodiments of the present invention may be made without departing from the scope thereof, it is to be understood that all matter set forth in this specification or shown in the accompanying drawing is to be interpreted as illustrative only and not in a limiting sense.

We claim:

1. In an instrument for the measurement of temperature differential, a temperature sensing arrangement comprising a thermocouple for location in one area of temperature variation, a second thermocouple for location in a second area of temperature variation, electrical connection between said thermocouples as a means of producing the differential potential between said thermocouples, a potential balance comparison circuit, a standard cell in said circuit, means for applying said thermocouple differential potential to said comparison circuit for reference with respect to a variable reference potential including the potential of said standard cell to produce a voltage in variance from a balance condition, and an arrangement for automatically varying said reference potential in at least partial compensation for non-linearity as between the potentials of said first and second thermocouples and the temperatures to which they are respectively responsive, within predetermined temperature variation limits, said arrangement comprising a third thermocouple for location in one of said areas of temperature variation, a voltage divider for predetermined reduction of the potential of said third thermocouple, and means for applying said reduced potential to said standard cell in a totalling action with respect to the potential of said standard cell to produce said reference potential.

2. In an instrument of the type in which a thermocouple unit is used to sense a variable temperature to produce voltage variations representative of changes in said temperature, in which said voltage variations from said thermocouple unit are compared in a voltage comparison circuit with a reference voltage from a source of standard voltage to produce a resulting voltage which is supplied from said voltage comparison circuit to instrument means, and in which said instrument means are responsive to said resulting voltage, apparatus for compensating for any nonlinear characteristics in the voltage variations produced by said thermocouple unit as a function of the ranges of temperature being sensed by said thermocouple unit so that said instrument means are enabled to respond more accurately to the actual temperature being sensed, said apparatus comprising: a first thermocouple unit located so as to sense the variable temperature, a voltage comparison circuit, first circuit means coupling the voltage variations produced by said thermocouple unit into said voltage comparison circuit, a source of standard voltage, a second thermocouple unit having characteristics similar to those of said first unit, said second thermocouple unit being located so as to sense approximately the same temperature as said first thermocouple unit to produce voltage variations similar to those produced by said first thermocouple unit, second circuit means coupling at least a portion of the voltage variations from said second thermocouple unit to said source of standard voltage to be totalled with the voltage thereof to produce a totalled reference voltage, third circuit means coupling said totalled reference voltage into said voltage comparison circuit where the voltage variations from said first thermocouple are compared therewith to produce a resulting voltage, instrument means arranged to be responsive to said resulting voltage, and fourth circuit means coupling said resulting voltage to said instrument means, whereby said instrument means receive a more nearly linear resulting voltage as a function of actual temperature variations than the voltage variations produced by said first thermocouple unit as a function of the actual temperature variations.

3. In an instrument for the measurement of temperature differential of the type wherein a first thermocouple is arranged to be located in one area of temperature variation and a sound thermocouple is arranged to be located in a second area of temperature variation and in which there is an electrical connection between said thermocouples as a means of producing a differential potential between said thermocouples, apparatus for compensating for non-linearity as between the potentials of said first and second thermocouples and the temperatures to which they are made respectively responsive comprising: a potential comparison circuit, first circuit means for applying the thermocouple differential potential to said comparison circuit, a source of standard potential, a third thermocouple having characteristics similar to those of said first and second thermocouples, said third thermocouple being arranged to be located in one of said areas of temperature variation, second circuit means for applying at least a portion of the potential from said third thermocouple to said source of standard potential to be totalled therewith to produce a totalled reference potential, third circuit means arranged to apply said totalled reference potential to said potential comparison circuit where the differential potential from said first and second thermocouples is compared therewith to produce a resulting potential, instrument means arranged to be responsive to said resulting potential, and fourth circuit means coupling said resulting potential to said instrument means, whereby said instrument means receives a more linear resulting potential than the differential potential from said first and second thermocouples.

LOUIS GOODMAN.
EVERETT O. OLSEN.

References Cited in the file of this patent
UNITED STATES PATENTS

| Number | Name | Date |
|---|---|---|
| 1,411,033 | Jensen | Mar. 28, 1922 |
| 2,635,468 | Field et al. | Apr. 21, 1953 |

OTHER REFERENCES

Article in Journal of Applied Physics, "A Non-Contact Temperature Measuring Device" by Field and Gehman in vol. 22, No. 1, pgs. 106–107, January 1951.